United States Patent
Isobe

(10) Patent No.: US 6,681,806 B2
(45) Date of Patent: Jan. 27, 2004

(54) SOLENOID VALVE

(75) Inventor: Eiji Isobe, Kariya (JP)

(73) Assignee: Denso Corporation (JP)

( * ) Notice: Subject to any disclaimer, the term of this patent is extended or adjusted under 35 U.S.C. 154(b) by 28 days.

(21) Appl. No.: 10/105,184

(22) Filed: Mar. 26, 2002

(65) Prior Publication Data

US 2002/0134444 A1 Sep. 26, 2002

(30) Foreign Application Priority Data

Mar. 26, 2001 (JP) ........................................ 2001-086819

(51) Int. Cl.[7] .............................................. F15B 13/044
(52) U.S. Cl. ................................ 137/625.65; 137/625.68
(58) Field of Search ........................ 137/625.65, 625.68

(56) References Cited

U.S. PATENT DOCUMENTS

| 5,630,569 A | * | 5/1997 | Oehler et al. | ......... | 137/625.65 |
| 5,878,782 A | * | 3/1999 | Nakajima | .............. | 137/625.65 |
| 6,289,921 B1 | * | 9/2001 | Neuhaus et al. | ....... | 137/625.65 |
| 6,315,268 B1 | * | 11/2001 | Cornea et al. | ......... | 137/625.65 |
| 6,527,249 B2 | * | 3/2003 | Niimi et al. | ............ | 137/625.89 |

OTHER PUBLICATIONS

Copy of U.S. patent application Ser. No. 09/684,906, filed Oct. 10, 2000.

* cited by examiner

Primary Examiner—Gerald A. Michalsky
(74) Attorney, Agent, or Firm—Nixon & Vanderhye PC

(57) ABSTRACT

A feed position of oil from an oil pump is changed to improve the machinability of an engine cylinder block. A plunger guide is obtained which attains improvement in pump pressure resistance and retention of magnetic efficiency. An oil feed port connected to an oil feed path on the oil pump side is formed in a front end face of a sleeve in an electromagnetic type oil control valve, while a drain port connected to an oil discharge path on a drain side is formed in a side face of the sleeve, whereby an oil feed path formed in the engine cylinder block is positioned coaxially with a mounting hole of the electromagnetic type oil control valve. Further, a bottom wall portion of the plunger guide is curved so that the pump pressure resistance can be improved without increasing the plate thickness of the plunger guide.

10 Claims, 5 Drawing Sheets a > b d < c

SOLENOID VALVE

CROSS REFERENCE TO RELATED APPLICATION

This application is based on, and incorporates herein by reference, Japanese Patent Application No. 2001-86819 filed on Mar. 26, 2001.

BACKGROUND OF THE INVENTION

1. Field of the Invention

The present invention relates to a solenoid valve. Particularly, the invention relates to an electromagnetic type oil control valve capable of switching between an advance and a retard chamber in a variable valve timing mechanism. The variable valve timing mechanism functions to change the timing of an intake or exhaust valve of, for example, an internal combustion engine.

2. Description of Related Art

Shown in FIGS. 6 and 7 is a related art electromagnetic type oil control valve 100 comprising a sleeve 105, a spool 106, a spring 107 for urging the spool 106 rightwards (with reference to FIG. 6), and an electromagnetic drive unit 109 for changing a position of the spool 106. The sleeve 105 has an opening 101 connected to an oil path formed on an oil pump side, an opening 102 connected to an oil path formed on a retard chamber side in a continuously variable valve timing mechanism, an opening 103 connected to an oil path formed on an advance chamber side in the continuously variable valve timing mechanism, and an opening 104 connected to an oil path formed on a drain side. The spool 106 has concavities and convexities corresponding to the openings 101–104.

The electromagnetic drive unit 109 is provided with an electromagnetic coil 112 wound around an outer periphery of a coil bobbin 111, a plunger 114 adapted to move integrally with a shaft 113, and a plunger guide 117 disposed between a stator core 115 and a yoke 116. In the electromagnetic type oil control valve 100, the plunger 114 is allowed to move linearly caused by an attracting force of the electromagnetic coil 112. The power thereof is used to move the spool 106 disposed within the sleeve 105, thereby switching the supply of oil to the retard chamber or the advance chamber, the supply of oil being from the oil pump to the continuously variable valve timing mechanism.

In the related art, supplying oil from the oil pump to the electromagnetic oil control valve 100 may be performed by the opening 101 formed in the side face of the sleeve 105. However, in machining the engine block, when the oil path from the oil pump is to be machined, complicated machining is sometimes necessary. This machining is sometimes necessary to fill holes after drilling in multiple directions in order to avoid interference with other oil paths, etc.

The machinability can be improved by using a single-drain hollow spool valve type solenoid valve and switching the arrangement of a partitioning portion between the oil pump side and the drain side, thereby allowing the opening connected to the oil pump-side oil path to be moved to the front end of the electromagnetic type oil control valve. However, since the pump pressure is applied to the interior of the oil control valve, higher strength is required for each component. In particular, to the plunger guide 117, as shown in FIGS. 6 and 7, since thin-walled stainless steel permits the improvement of magnetic efficiency, there arises the problem that if the plate thickness of the plunger guide 117 is increased for the purpose of improving its strength, a lower magnetic efficiency will result.

If an electromagnetic type oil control valve 100 of a side face oil supply type is used as the foregoing electromagnetic oil control valve of the front end face oil supply type, the opening connected to the drain-side oil path will open earlier than the opening connected to the oil pump-side oil path. There arises the problem that a vane rotor in the continuously variable valve timing mechanism will not be held steady, thus leading to a malfunction of the continuously variable valve timing mechanism.

SUMMARY OF THE INVENTION

It is an object of the present invention to improve the machinability of a feed path forming member by changing a feed position of a fluid or oil source. It is another object of the present invention to provide a non-magnetic member capable of attaining both improvement of pressure resistance and retention of magnetic efficiency. It is yet another object of the present invention to hold steady a vane rotor in a variable valve timing mechanism by opening an oil path on an oil source side earlier than an oil path on a drain side.

In one aspect of the present invention there is provided a solenoid valve wherein a feed port connected to a fluid flow path on a fluid source side is formed in one axial end face of a sleeve, while a discharge port connected to a drain-side fluid flow path is formed in the side face of the sleeve. A fluid pressure from the fluid source is applied to the whole of the interior of the solenoid valve. Particularly, the fluid pressure from the fluid source is applied to the bottom of a non-magnetic member which axially supports a movable member. By forming the bottom of the non-magnetic member with a curved shape so as to expand to the side opposite to the feed port side, it is possible to relieve stress concentration(s) on the bottom of the non-magnetic member. Consequently, the fluid pressure resistance of the solenoid valve can be improved without increasing the plate thickness of the non-magnetic member, and thus there is no fear of lowering the magnetic efficiency.

In another aspect of the present invention, the fluid flow path on the fluid source side is formed in a fluid flow path forming member formed coaxially with a solenoid valve mounting hole. Therefore, it is possible to decrease the number of machining steps for a feed path forming member. In a further aspect of the present invention, an inner periphery of a sleeve is formed with a contact surface for contact with an outer periphery of a hollow spool, whereby it is possible to prevent locking and wear caused by engagement of the sleeve with the hollow spool. In yet another aspect of the present invention, side corner portions for forming a concave fluid passage to provide communication between first and second openings and a discharge port are formed on the outer periphery of the hollow spool and are chamfered, whereby the flow of fluid can be stabilized and it is possible to improve control and stability of the system.

In still yet another aspect of the present invention, a side face feed valve is provided for feeding oil sideways from an oil source to a front end face feed valve for feeding oil from an axial front end face to a discharge port connected to a drain-side oil path. Additionally, a sleeve and a hollow sleeve are designed such that oil is fed into a retard chamber in a variable valve timing mechanism to let a first opening become larger than a second opening in a retarding operation involving draining oil present in an advance chamber in the variable valve timing mechanism. Additionally, the oil of the oil source is fed into the advance chamber to let the second opening become larger than the first opening in an advancing operation involving draining oil present in the retard chamber. According to this configuration, the first and second openings on the oil source side open earlier than the first and second openings on the drain side, so that the oil pressure from the oil source is constantly applied to the retard chamber or the advance chamber in the variable valve timing mechanism. Therefore, the operation of a vane rotor in the mechanism becomes stable.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment(s) is merely exemplary in nature and is in no way intended to limit the invention, its application, or uses.

Figure 1:
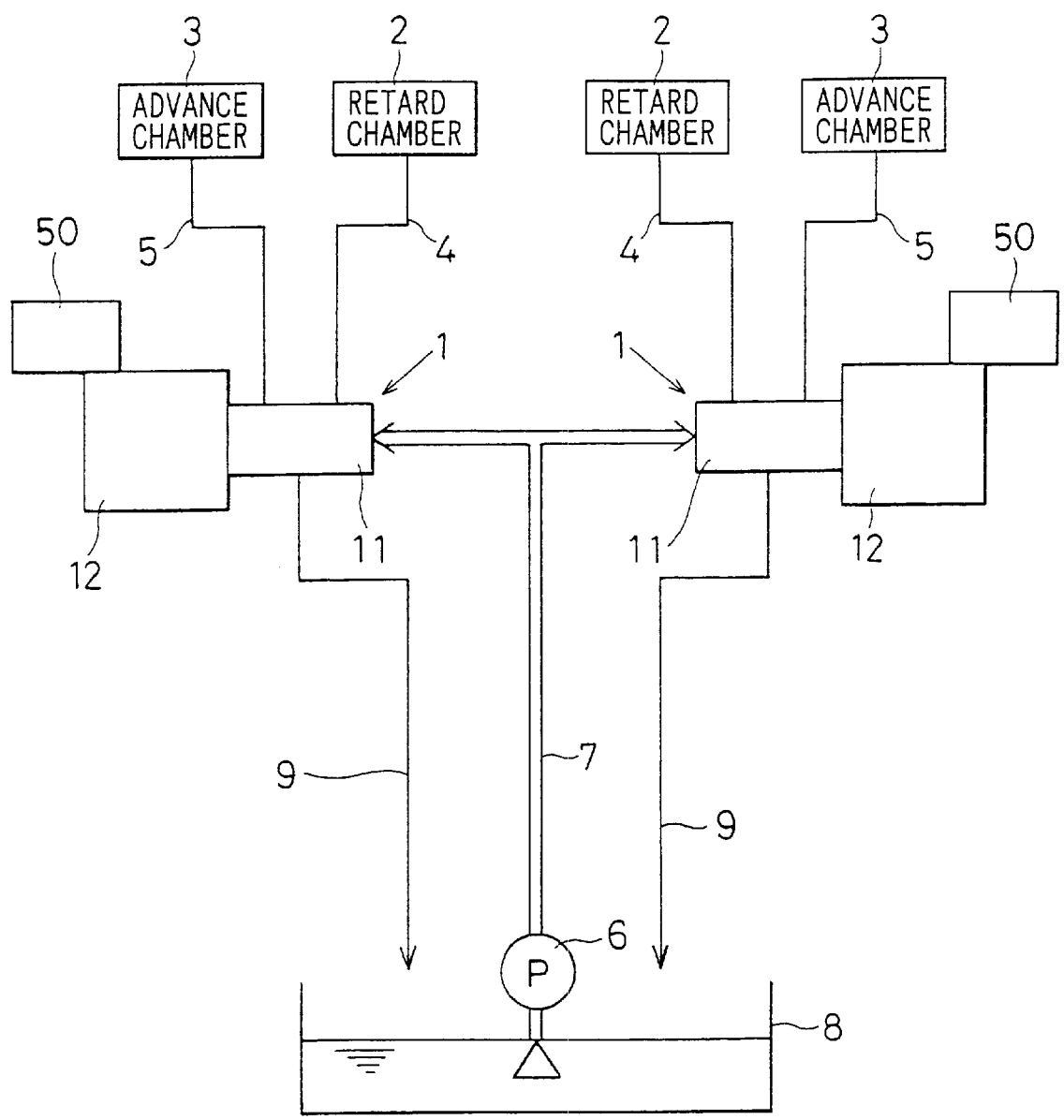
FIG. 1 is a schematic view of a hydraulic circuit for feeding and discharging oil selectively to and from a retard chamber or an advance chamber in a variable intake and exhaust valve timing mechanism in an embodiment of the present invention.
Figure 2:
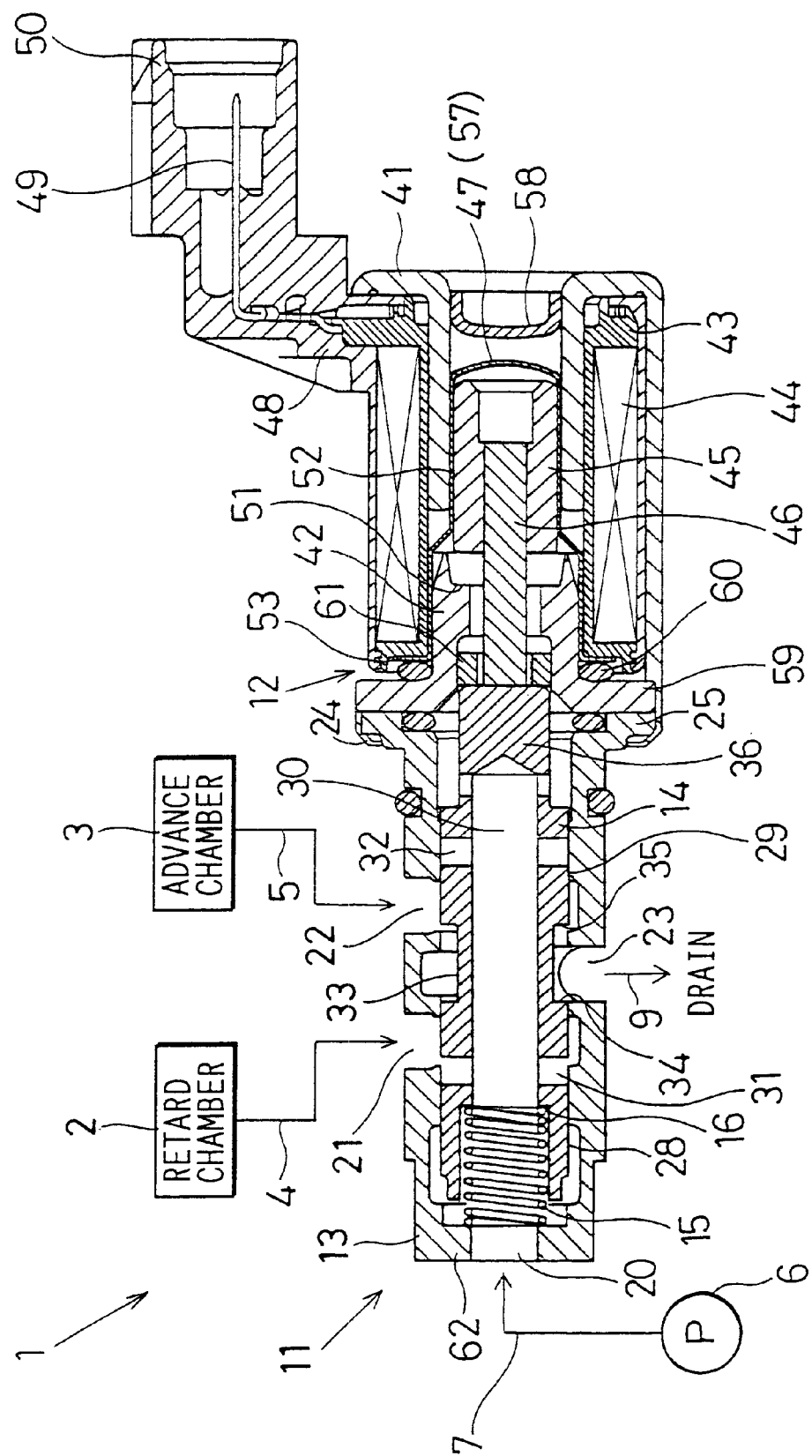
FIG. 2 is a cross-sectional view of a structure of an electromagnetic type oil control valve in an embodiment of the present invention.

An embodiment of the present invention will now be described with reference to the accompanying drawings, in which FIG. 1 is a schematic view of a hydraulic circuit for selectively feeding and discharging an oil pressure with respect to a retard chamber or an advance chamber in a variable intake/exhaust valve timing mechanism. FIG. 2 is a cross-sectional view of an electromagnetic type oil control valve.

The electromagnetic type oil control valve 1 is a solenoid valve capable of selectively switching the supply of oil to a retard chamber 2 or an advance chamber 3 in a continuously variable valve timing adjusting device. The valve timing adjusting device is designed to continuously change an opening/closing timing of an intake valve and an exhaust valve (neither shown) disposed within a cylinder head of a four-cycle reciprocating engine, e.g., DOHC (double overhead camshaft) engine (hereinafter referred to simply as "engine").

The continuously variable valve timing adjusting device is made up of a timing rotor (not shown) which is rotated by an engine crank shaft. Intake and exhaust side cam shafts (not shown) are provided so as to be relatively rotatable with respect to the timing rotor, a variable intake/exhaust valve timing mechanism which incorporates therein a vane rotor (not shown). The vane rotor is rotatably received within the timing rotor in a fixed state relative to the intake and exhaust side cam shafts, and an engine control unit ("ECU" hereinafter) for electronically controlling the electromagnetic type oil control valve 1 which is for the supply and discharge of oil selectively to and from the retard chamber (retard oil pressure chamber) 2 and the advance chamber (advance oil pressure chamber) 3 in the variable intake/exhaust valve timing mechanism.

In a hydraulic system circuit for the supply and discharge of oil selectively to and from the retard chamber 2 or the advance chamber 3 there are provided a first oil feed path (corresponding to the first fluid flow path and the retard chamber-side oil path in the present invention) 4 for the supply and discharge of oil to and from the interior of the retard chamber 2, and a second oil feed path (corresponding to the second fluid flow path and the advance chamber-side oil path in the present invention) 5 for the supply and discharge of oil to and from the interior of the advance chamber 3. The first and second oil feed paths 4, 5 are formed in the cylinder head of the engine, serving also as drain oil paths to drain oil from the interior of the retard chamber 2 or the advance chamber 3.

An oil feed path (corresponding to the fluid source-side fluid flow path and the oil source-side oil path in the present invention) 7 on an oil pump 6 side and an oil discharge path (corresponding to the drain-side fluid flow path and the drain-side oil path in the present invention) 9 are connected to the first and second oil feed paths 4 and 5, respectively, through oil paths formed in an outer periphery of a hollow spool 14 in the electromagnetic type oil control valve (OCV). The oil discharge path 9 is an oil drain path for draining oil from the interior of the retard chamber 2 or the advance chamber 3.

In the oil feed path 7 is provided the oil pump (oil source) 6 for pumping oil from the interior of an oil pan (drain) 8 and discharging it to various portions of the engine. The oil pan 8 functions to store engine oil as a working fluid. An outlet end of the oil discharge path 9 is in communication with the oil pan 8. The oil pump 6 is rotated in synchronism with rotation of the engine crank shaft and feeds oil in an amount proportional to the engine speed to various portions of the engine. The oil feed path 7 and the oil discharge path 9 are formed within the engine cylinder head or cylinder block (fluid flow path forming member).

The electromagnetic type oil control valve 1 is a solenoid valve of a one-drain hollow spool valve type. As also shown partially in FIGS. 3 and 4, the oil control valve 1 is constructed so as to permit relative switching control between the first and second oil feed paths 4, 5, as well as the oil feed path 7 and the oil discharge path 9, with use of an oil feed/discharge means having a control valve (spool control valve) 11 provided in the hydraulic system circuit and also having an electromagnetic actuator (linear solenoid) 12 which actuates the control valve 11 in an advance direction. The control valve 11 is provided with a cylindrical sleeve 13 disposed between the first oil path 4, second oil path 5 and the oil feed path 7 and oil discharge paths 9. The control valve 11 is also provided with a hollow spool (hollow spool valve) 14 which is slidably received within the sleeve 13. In this embodiment, a spring 15 serving as spool and plunger urging means (movable member urging means) for urging a hollow spool 14 in a most retard direction, i.e., rightwards in the figure (to the electromagnetic actuator 12 side), is disposed between an annular wall portion (a most advance stopper 62 to be described later) formed on a front end side of the sleeve 13 and a stepped portion 16 of an axial bore 30 (to be described later) formed on a front end side of the spool 14.

An oil feed port (corresponding to the feed port in the present invention) 20, which is connected to the oil feed path 7 on the oil pump 6 side, is formed in an axial front end face (left-hand end face in the figure) of the sleeve 13. In a side face (upper side face) of the sleeve 13 are formed a first oil feed/discharge port (corresponding to the first opening in the present invention) 21 connected to the first oil feed path 4 on the retard chamber 2 side and a second oil feed/discharge port (corresponding to the second opening in the present invention) 22 connected to the second oil feed path 5 on the advance chamber 3 side. Further, in a side face (lower side face) of the sleeve 13 is formed a drain port (corresponding to the discharge port in the present invention) 23 which is connected to the drain-side oil discharge path 9.

Figure 3:
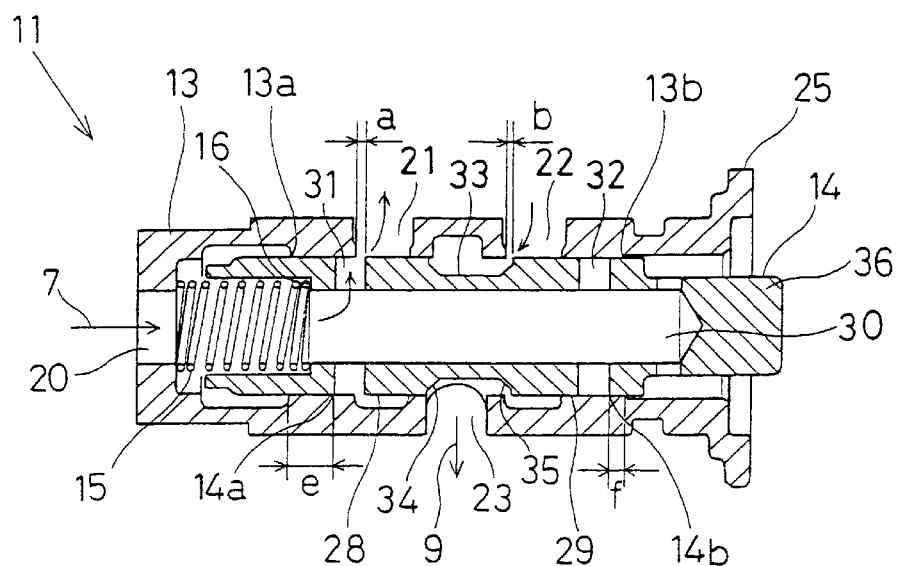
FIG. 3 is a cross-sectional view of a position of a hollow spool in a retard state in an embodiment of the present invention.

On an inner peripheral surface of the sleeve 13, as shown in FIG. 3, there are formed contact surfaces e and f which are kept in contact with an outer peripheral surface of the hollow spool 14 during movement of the hollow spool 14. The provision of the contact surfaces e and f prevents corner portions 13a and 13b of the sleeve 13 and corner portions 14a and 14b of the hollow spool 14 from intersecting each other. At an axial rear end of the sleeve 13 is formed a flange portion 25 to be caulked with a caulking portion 24 (to be described later) of the electromagnetic actuator 12.

The hollow spool 14 is supported for axial reciprocation within the sleeve 13 and moves leftwards (in FIG. 3) when an axial force of the actuator 12 acting on the right end portion (in the figure) of the hollow spool 14 increases and overcomes the biasing force (resilience) of the spring 15. On the outer periphery of the hollow spool 14 are formed a first land 28 and a second land 29. In the interior of the hollow spool 14 is formed an axial bore 30 which is in communication with the oil feed port 20 of the sleeve 13. The axial bore 30 is open and closed at its left and right ends, respectively, in the figure. The inside diameter of the axial bore 30 on an axially front end side (left end side in the figure) is larger than the inside diameter thereof on an axially rear end side (right end side in the figure) both with respect to the stepped portion 16.

In the first land 28 is formed a circumferential first oil feed port 31 which provides communication between the first oil feed/discharge port 21 in the sleeve 13 and the axial bore 30. In the second land 29 is formed a circumferential second oil feed port 32 which provides communication between the second oil feed/discharge port 22 in the sleeve 13 and the axial bore 30. Between the first and second lands 28, 29 are formed annular, side corner portions 34 and 35 for defining a concave, circumferential communication oil path (corresponding to the concave fluid passage in the present invention) 33, the communication oil path 33 capable of making one of the first and second oil feed/discharge ports 21, 22 in the sleeve 13 communicate with the drain port 23. The side corner portions 34 and 35 are chamfered for stabilizing the flow of oil. At the right end in the figure of the hollow spool 14 is formed a connecting portion 36 for connecting with the electromagnetic actuator 12, the connecting portion 36 being smaller in outside diameter than the first and second lands 28, 29.

The electromagnetic actuator 12 is an electromagnetic drive unit which actuates the hollow spool 14 to a most advanced position against the biasing force of the spring 15. The actuator 12 is constructed of a yoke 41 and a stator core 42, as a stator (corresponding to the magnetic member in the present invention), a coil bobbin 43 disposed on outer peripheries of the yoke 41 and the stator core 42, a solenoid coil (corresponding to the electromagnetic coil in the present invention) 44 wound around the coil bobbin 43, a plunger (moving core) 45 made of a magnetic material and disposed on an inner peripheral side with respect to the coil bobbin 43, a solenoid shaft 46 made of a non-magnetic material and adapted to operate integrally with the plunger 45, and a plunger guide (corresponding to the non-magnetic member in the present invention) 47 for guiding the plunger 45 in an axially reciprocating manner. An inner cylindrical portion of the yoke 41 and an attracting portion 51 of the stator core 42 are opposed to each other through a predetermined spacing in the moving direction of the plunger 45.

While the engine is in operation, a drive current is fed from the ECU to the solenoid coil 44 to generate a magnetomotive force. With this magnetomotive force, the plunger 45 is attracted. A resin is molded as a resin-molded member (a secondary resin molding) 48 on an outer periphery of the solenoid coil 44, and at a portion of the resin-molded member 48 exposed to the exterior with respect to the yoke 41 there is formed an integrally molded connector portion 50, with a terminal (external connection terminal) 49 being insert-molded in the connector portion 50. The terminal 49 provides an electrical connection between the solenoid coil 44 and a vehicular power supply. The ECU controls a control mode of the electromagnetic oil control valve 1 so as to provide an optimum opening/closing timing value of the intake and exhaust valves in the engine.

In FIG. 2 the left end portion of the solenoid shaft 46 of the electromagnetic actuator 12 abuts the right end face of the connecting portion 36 of the hollow spool 14 in the control valve 11. As a result, in the hollow spool 14 of the control valve 11, the solenoid coil 44 is energized and a magnetomotive force is generated therein. With this magnetomotive force, the plunger 45 is attracted to the attracting portion 51 of the stator core 42, whereupon the plunger 45 and the solenoid shaft 46 together move in one axial direction (leftwards in FIG. 2). When the solenoid coil 44 is de-energized and the magnetomotive force of the solenoid coil 44 stops, the hollow spool 14 moves axially to the opposite side (to the right in FIG. 2) together with the plunger 45 and the solenoid shaft 46 under the biasing force of the spring 15 which acts toward the opposite side (to the right in FIG. 2). The coil bobbin 43 is a primary resin molded piece obtained by integrally molding resin in a generally cylindrical shape.

Figure 5:
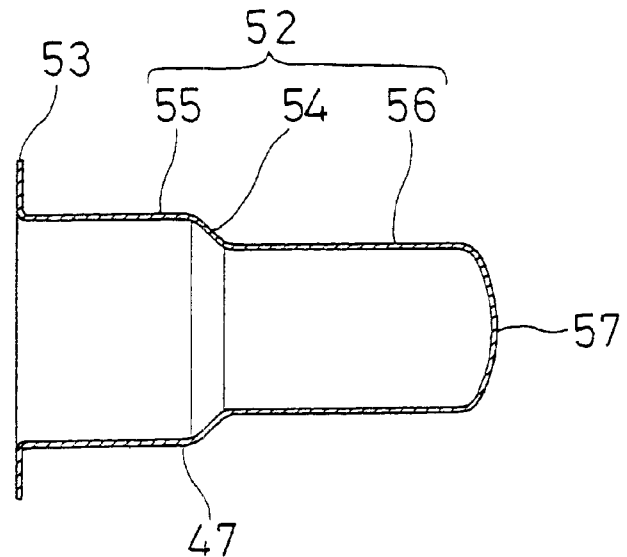
FIG. 5 is a cross-sectional view of a plunger guide in an embodiment of the present invention.
Figure 7:
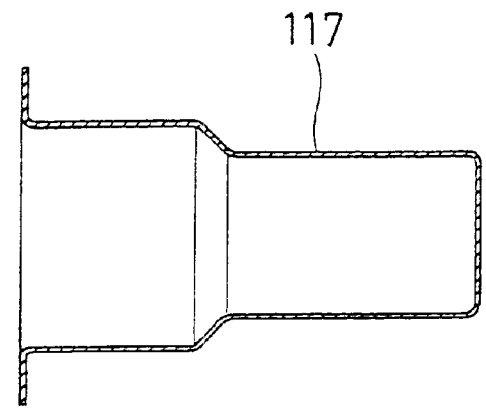
FIG. 7 is a cross-sectional related art view of a plunger guide.
Figure 6:
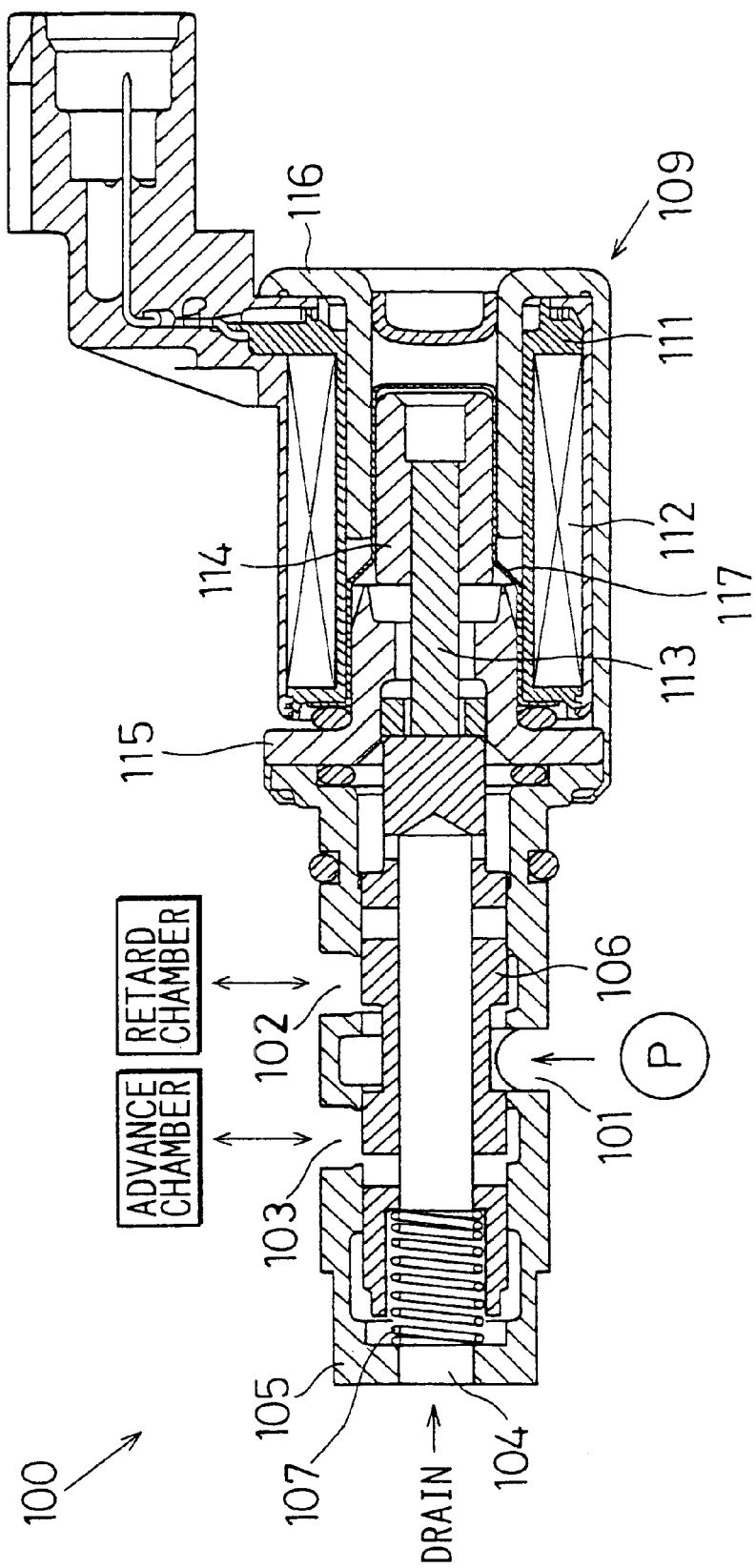
FIG. 6 is a cross-sectional related art view of an electromagnetic type oil control valve.

The plunger 45 is formed in a cylindrical shape and the solenoid shaft 46 is press-fitted and fixed into an axial bore of the plunger. As shown in FIGS. 2 and 5, the plunger guide 47 is formed in a predetermined bottomed cylindrical shape (cup shape) by, for example, pressing or extruding a non-magnetic material such as a thin-walled stainless steel. The plunger guide 47 has a cylindrical wall portion 52 located between an inner periphery of the inner cylindrical portion of the yoke 41 and an outer periphery of the plunger 45. The plunger guide 47 also has an annular flange potion 53 bent radially from one end side of the cylindrical wall portion 52.

The cylindrical wall portion 52 has a tapered portion 54. The outside diameter of the portion 55 located on the left side in FIG. 5 is larger than the tapered portion 54. The tapered portion 54 is larger than the outside diameter of portion 56 located on the right side of FIG. 5. The large-diameter portion 55 is positioned between an outer periphery of the cylindrical wall portion of the stator core 42 and an inner periphery of the cylindrical portion of the coil bobbin 43. The small-diameter portion 56, is positioned between the inner periphery of the cylindrical wall portion of the yoke 41 and the outer periphery of the plunger 45. The tapered portion 54 is fitted in the gap between the inner cylindrical portion of the yoke 41 and the attracting portion 51 of the stator core 42. At the right end portion in FIG. 2 of the cylindrical wall 52 is provided a curved bottom wall portion 57 which covers the rear end portion of the plunger 45. The curved bottom wall portion 57 is convexly shaped to protrude away from the plunger 45, so as to form a gap between the plunger 45 and curved bottom wall portion 57. A seal member 58 for sealing an opening of the yoke 41 is mounted at the rear end of the inner cylindrical portion of the yoke.

The flange portion 53 of the plunger guide 47 is held grippingly between a collar portion of the coil bobbin 43 and a flange portion 59 of the stator core 42. The caulking portion 24 of the yoke 41 caulks the flange portion 25 of the sleeve 13, whereby the flange portion 53 is connected to the flange portion 25 of the sleeve 13 in a liquid-tight manner. Between the flange portion 53 of the plunger guide 47 and the flange portion 59 of the stator core 42 is mounted a seal member 60 such as an O-ring for preventing the leakage of oil from between the flange portions 53 and 59.

The movement of the hollow spool 14, plunger 45 and solenoid shaft 46 in a full retard direction (to the right in FIG. 2) is inhibited by abutment of the hollow spool 14 against an annular full retard stopper 61 which is fixed to an inner periphery of the stator core 42. Likewise, movement of the hollow spool 14, plunger 45 and solenoid shaft 46 in the full advance direction (to the left in FIG. 2) is inhibited by abutment of the left end face in the figure of the hollow spool 14 against the annular full advance stopper 62 provided at the front end of sleeve 13.

[Operation]

The operation of the electromagnetic oil control valve 1 of the embodiment will be described below with reference to FIGS. 1 through 5.

During idling of an internal combustion engine, it is necessary that an opening/closing timing of the intake valve be delayed to eliminate overlap (a period of time during which the intake and exhaust valves are both open) and thereby stabilize combustion. At this time, a control current is not supplied to the solenoid coil 44 of the electromagnetic actuator 12. FIGS. 2 and 3 illustrate a state (most retard control) in which the solenoid coil 44 is not supplied with a control current. At this time, no magnetomotive force is exerted on the plunger 45, and the hollow spool 14 in the control valve 11, as well as the plunger 45 and the solenoid shaft 46 in the electromagnetic actuator 12, are in their full retard positions in which the hollow spool 14 abuts the most retard stopper 61 due to the biasing force of the spring 15, as shown in FIGS. 2 and 3.

In this state, as shown in FIG. 3, the first oil feed/discharge port 21 in the sleeve 13 and the first oil feed port 31 in the hollow spool 14 communicate with each other, the second oil feed/discharge port 22 in the sleeve 13 and the second oil feed port 32 in the hollow spool 14 are cut off, and the second oil feed/discharge port 22 and the drain port 23 in the sleeve 13 communicate with each other through the concave communication oil path 33 formed in the hollow spool 14. As a result, oil is fed from the oil pump 6 into the retard chamber 2 through oil feed path 7, oil feed port 20 in the sleeve 13, axial bore 30 in the hollow spool 14, first oil feed port 31, first oil feed/discharge port 21, and first oil feed path 4. At the same time, the oil present within the advance chamber 3 is drained to the oil pan (drain) 8 through the second oil feed path 5, second oil feed/discharge port 22, concave communication oil path 33, drain port 23, and oil discharge path 9.

Figure 4:
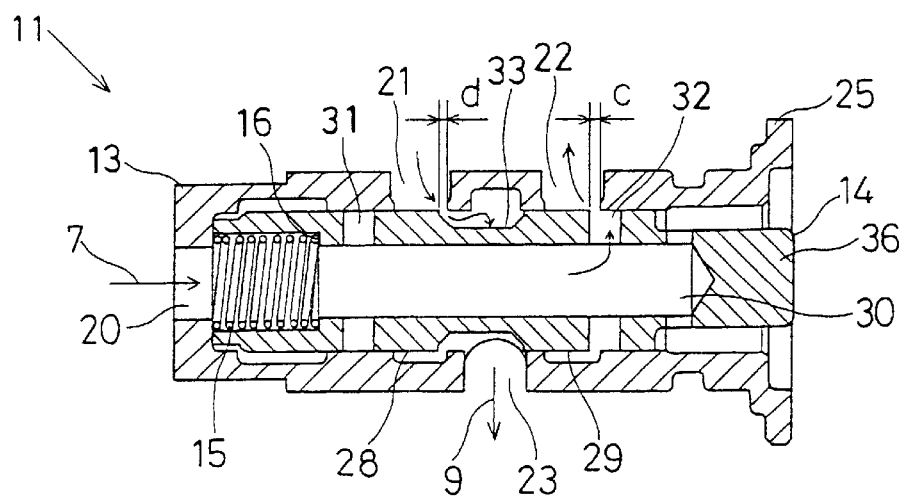
FIG. 4 is a cross-sectional view of a position of the hollow spool in an advance state in an embodiment of the present invention.

If required, the opening/closing timing of the intake valve may be hastened to enlarge overlap, thereby increasing self-EGR (residual gas in the combustion chamber) and reducing the combustion chamber to diminish the amount of HC and NOx discharged. This also leads to a decrease of pump loss and improvement of fuel economy. Therefore, the solenoid coil 44 of the electromagnetic actuator 12 is energized at a maximum current value. FIG. 4 illustrates a state (full advance control) in which a control current is fed to the solenoid coil 44. Against the biasing force of the spring 15, the plunger 45 is attracted toward the attracting portion 51 of the stator core 42 while being guided by the small-diameter portion 56 of the plunger guide 47. The hollow spool 14 moves leftwards with respect to FIG. 2 together with the plunger 45 and the solenoid shaft 46. The hollow spool 14 is retained by the full advance stopper 62.

At this time, as shown in FIG. 4, the first oil feed/discharge port 21 in the sleeve 13 and the first oil feed port 31 in the hollow spool 14 are cut off, the second oil feed/discharge port 22 in the sleeve 13 and the second oil feed port 32 in the hollow spool 14 communicate with each other, and the first oil feed/discharge port 21 and the drain port 23 in the sleeve 13 communicate with each other through the concave communication oil path 33 in the hollow spool 14. As a result, oil is fed from the oil pump 6 into the advance chamber 3 through the oil feed path 7, oil feed port 20 in the sleeve 13, axial bore 30 in the hollow spool 14, second oil feed port 32, second oil feed/discharge port 22, and second oil feed path 5. At the same time, the oil present within the retard chamber 2 is drained to the oil pan (drain) 8 through the first oil feed path 7, first oil feed/discharge port 21, concave communication oil path 33, drain port 23, and oil discharge path 9.

[Effect]

Thus, in this embodiment, as shown in FIGS. 1 and 2, the oil feed port 20 connected to the oil feed path 7 on the oil pump 6 side is formed in the front end face (left end face of FIG. 2) of the sleeve 13 in the electromagnetic oil control valve 1, and the drain port 23 connected to the oil discharge path 9 on the oil pan (drain) 8 side is formed in a side face (lower end face in the figure) of the sleeve 13 in the oil control valve 1. Therefore, the oil feed path 7 formed in the engine cylinder block can be aligned with the mounting hole of the oil control valve 1.

In a certain DOHC engine there is adopted a variable intake/exhaust valve timing mechanism for changing the opening/closing timing of the intake and exhaust valves. Thus, in the case where a mounting hole is formed so as to permit an opposed arrangement of front end faces of both electromagnetic oil control valve 1 for the variable intake valve timing mechanism and electromagnetic oil control valve 1 for the variable exhaust valve timing mechanism, the oil feed path 7 may be formed in a simple shape, i.e., in a general "T" shape, as shown in FIG. 1. With this arrangement, during machining of the oil feed path 7 from the oil pump 6 on the engine cylinder block, interference of the oil feed path 7 with other oil paths, etc. decreases, so that it is possible to eliminate the task of filling up unnecessary holes after drilling in multiple directions. In this embodiment, it is sufficient if there is drilling in only two directions, that is, transverse and vertical directions in the FIG. 1. Thus, oil path machining can be simplified. In addition, the mounting hole for the electromagnetic oil control valve and the oil feed path 7 can be installed by die casting or cutting, whereby it is possible to decrease the number of working and manufacturing steps and reduce the overall manufacturing cost.

In the electromagnetic oil control valve 1 of this embodiment, as shown in FIGS. 3 and 4, the contact surfaces e and f are formed on the inner peripheral surface of the sleeve 13 for contact with the outer peripheral surface of the hollow spool 14 during movement of the hollow spool, whereby it is possible to prevent the corner portions 13a and 13b of the sleeve 13 and the corner portions 14a and 14b of the hollow spool 14 from intersecting each other. Consequently, it is possible to prevent locking and wear caused by jamming of sleeve 13 and hollow spool 14.

Moreover, in the magnetic oil control valve 1 of this embodiment, as shown in FIGS. 3 and 4, the port shape in the sleeve 13 and that in the hollow spool 14 are designed so that the first opening a, formed between the sleeve 13 and the hollow spool 14 in the portion connecting the oil pump 6 and the retard chamber 2, becomes larger than the second opening b, formed between the sleeve 13 and the hollow spool 14 in the portion connecting the advance chamber 3 and the oil pan (drain) 8, in retard operation. The port shape in the sleeve 13 and that in the hollow spool 14 are also designed so that the second opening c, formed between the sleeve 13 and the hollow spool 14 in the portion connecting the oil pump 6 and the advance chamber 3 becomes larger than the first opening d, formed between the sleeve 13 and the hollow spool 14 in the portion connecting the retard chamber 2 and the oil pan (drain) 8, in advance operation. According to this design, the first and second openings, a and c, on the oil pump 6 side, open earlier than the second and first openings, b and d, on the oil pan (drain) 8 side, so that the pump pressure is applied constantly to the retard chamber 2 or the advance chamber 3 in the continuously variable valve timing mechanism. Therefore, the operation of the vane rotor in the same mechanism becomes stable.

Further, in the electromagnetic oil control valve 1 of this embodiment, as shown in FIGS. 3 and 4, since the side corner portions 34 and 35 which define the concave communication oil path 33 connected to the oil discharge path 9 on the oil pan (drain) 8 side of the hollow spool 14 are chamfered, it is possible to stabilize the flow of oil passing through the concave communication oil path 33 and hence possible to smoothly drain the oil present within the retard chamber 2 or the advance chamber 3. Consequently, it is possible to improve the control stability of the vane rotor in the continuously variable valve timing mechanism.

If the bottom wall portion 57 of the plunger guide 47 which axially supports the movable plunger 45 is plane in shape, it experiences pump pressure over a wide area, but in the electromagnetic oil control valve of this embodiment, as shown in FIGS. 2 to 5, the bottom wall portion 57 is curved so as to form a gap between the bottom wall portion 57 and the plunger 45, whereby a stress concentration on the bottom wall portion 57 of the plunger guide 47 can be relieved. Consequently, the electromagnetic oil control valve 1 can be made strong enough to withstand the pump pressure without increasing the plate thickness of the plunger guide 47. So, since it is not necessary to increase the plate thickness of the plunger guide 47 which is formed of a non-magnetic material such as a thin-walled stainless steel, it is possible to prevent a lowering of magnetic efficiency.

[Modifications]

Although in the above embodiment the control current to be fed to the solenoid coil 44 of the electromagnetic actuator 12 is controlled so as to move the vane rotor in the variable intake/exhaust valve timing mechanism to the full retard or advance position, the intake and exhaust valve opening/closing timing and the control current for the solenoid coil 44 of the actuator 12 may be controlled so as to move the vane rotor in the variable intake/exhaust valve timing mechanism to an optimum position intermediate between the full retard position and the full advance position. That is, the movement position of the hollow spool 14 in the control valve 11 may be controlled.

Further, the control current for the solenoid coil 44 of the actuator 12 may be controlled so as to change the intake or exhaust valve opening/closing timing by 40–60° CA (crank angle). That is, the movement position of the hollow spool 14 in the control valve 11 may be controlled. In a high speed, high load condition, the closing timing of the intake valve may be delayed up to an optimum point to ensure a maximum output. Moreover, the opening/closing timing of the exhaust valve may be changed to further improve the engine performance.

Although in the above embodiment the solenoid valve of the present invention was applied to the electromagnetic oil control valve 1 which is for feeding and discharging oil from the oil pump (fluid source or oil source) 6 selectively to and from the retard chamber or the advance chamber in the variable intake/exhaust valve timing mechanism, embodiments of the solenoid valve of the present invention may also be applied to other mechanisms. An example is an electromagnetic oil control valve which is for feeding and discharging oil (line pressure) from the oil pump (fluid source or oil source) 6 selectively to and from a plurality of hydraulic servo units for driving hydraulic engaging elements (e.g., hydraulic multiple disc clutch, hydraulic multiple disc brake, and band brake) in an automatic transmission. Embodiments of the present invention are further applicable to an electromagnetic type flow path switching valve for switching from one fluid flow path to another for the flow of air, oil, water, or other fluid.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electromagnetic type fluid control valve for feeding and discharging fluid selectively to and from a retard chamber or an advance chamber in a variable valve timing mechanism which is for changing an opening/closing timing of at least one of an intake valve and an exhaust valve in an engine, comprising:

a sleeve, the sleeve having in one axial end face thereof a feed port connected to an oil path formed on an oil source side, the sleeve further having in a side face thereof a discharge port connected to a drain-side oil path, a first opening connected to an oil path formed on the retard chamber side, and a second opening connected to an oil path formed on the advance chamber side; and a spool with a hollow chamber, the hollow spool being slidably supported within the sleeve, the hollow spool having an axial bore which provides communication between the feed port and the first opening or the second opening, the sleeve and the hollow spool being constructed so that the first opening becomes larger than the second opening in retard operation and so that the second opening becomes larger than the first opening in advance operation.

2. The fluid control valve according to claim 1, wherein the oil source-side oil flow path is formed in a fluid flow path forming member formed coaxial with a mounting hole for mounting the fluid control valve.

3. A fluid control valve according to claim 2, wherein a contact surface for contact with an outer periphery of the hollow spool is formed on an inner periphery of the sleeve.

4. A solenoid valve according to claim 3, wherein a concave fluid path for communication between the first opening and the second opening and the discharge port, as well as side corner portions for forming the concave fluid path, are formed on the outer periphery of the hollow spool, the side corner portions of the hollow spool being chamfered.

5. A fluid control valve according to claim 2, wherein a concave fluid path for communication between the first opening and the second opening and the discharge port, as well as side corner portions for forming the concave fluid path, are formed on the outer periphery of the hollow spool, the side corner portions of the hollow spool being chamfered.

6. A fluid control valve according to claim 1, wherein a contact surface for contact with an outer periphery of the hollow spool is formed on an inner periphery of the sleeve.

7. A solenoid valve according to claim 6, wherein a concave fluid path for communication between the first opening and the second opening and the discharge port, as well as side corner portions for forming the concave fluid path, are formed on the outer periphery of the hollow spool, the side corner portions of the hollow spool being chamfered.

8. A fluid control valve according to claim 1, wherein a concave fluid path for communication between the first opening and the second opening and the discharge port, as well as side corner portions for forming the concave fluid path, are formed on the outer periphery of the hollow spool, the side corner portions of the hollow spool being chamfered.

9. A fluid control valve according to claim 1, further comprising:

a movable member coaxial with the hollow spool and adapted to reciprocate axially together with the hollow spool;

an electromagnetic coil which generates a magnetomotive force for attracting the movable member axially to a first side;

a movable member urging means which generates an urging force for urging the movable member axially to a second side;

a magnetic member which is fixed so as to surround the electromagnetic coil and which forms a magnetic circuit together with the movable member; and a non-magnetic member that is cylindrical, and disposed between an outer periphery of the movable member and an inner periphery of the magnetic member and that supports the movable member to permit the movable member to reciprocate, the non-magnetic member having a first end which is closed.

10. A fluid control valve according to claim 9, wherein the first closed end of the non-magnetic member is curved in a direction away from the feed port side.

* * * * *